United States Patent
Lee et al.

(10) Patent No.: US 10,283,750 B2
(45) Date of Patent: May 7, 2019

(54) RECHARGEABLE BATTERY MODULE

(71) Applicant: SAMSUNG SDI CO., LTD., Yongin-si, Gyeonggi-do (KR)

(72) Inventors: Jin-Hyon Lee, Yongin-si (KR);
Ji-Woon Lee, Yongin-si (KR);
Eun-Young Goh, Yongin-si (KR);
Sang-In Park, Yongin-si (KR);
Sung-Yong Kim, Yongin-si (KR);
Jin-Seon Shin, Yongin-si (KR);
Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 462 days.

(21) Appl. No.: 15/047,477

(22) Filed: Feb. 18, 2016

(65) Prior Publication Data

US 2016/0260949 A1 Sep. 8, 2016

(30) Foreign Application Priority Data

Mar. 2, 2015 (KR) ........................ 10-2015-0029331

(51) Int. Cl.
*H01M 2/20* (2006.01)
*H01M 10/04* (2006.01)
(Continued)

(52) U.S. Cl.
CPC ........... *H01M 2/204* (2013.01); *H01M 2/022* (2013.01); *H01M 4/30* (2013.01); *H01M 10/0422* (2013.01)

(58) Field of Classification Search
CPC .. H01M 10/0422; H01M 2/022; H01M 2/204; H01M 4/30
See application file for complete search history.

(56) References Cited

U.S. PATENT DOCUMENTS 5,998,051 A * 12/1999 Poirier ................. H01H 9/0271
429/58
2002/0142211 A1* 10/2002 Nakanishi ............. H01M 2/263
429/94

(Continued)

FOREIGN PATENT DOCUMENTS

JP 4025928 B2 12/2007

OTHER PUBLICATIONS

Abstract and Machine English Translation of Japanese Publication No. 08-287898 A, Nov. 1, 1996 Corresponding to Japanese Patent No. 4025928 B2, Dec. 26, 2007, 8 Pages.

*Primary Examiner* — Barbara L Gilliam
*Assistant Examiner* — Adam A Arciero
(74) *Attorney, Agent, or Firm* — Lewis Roca Rothgerber Christie LLP

(57) ABSTRACT

A rechargeable battery module that effectively imparts a curvature using a rechargeable battery formed as a pin-shaped rechargeable battery with a very small diameter is provided. The rechargeable battery module includes a plurality of rechargeable batteries arranged in parallel, wherein each rechargeable battery comprises a case and terminals that extend from respective ends of the case along a length direction of the case. The module includes a plurality of caps, wherein each cap is coupled to an end of a rechargeable battery of the plurality of rechargeable batteries and is electrically connected to one of the terminals of the rechargeable battery. The module also includes a connector on each cap connecting adjacent caps coupled to corresponding rechargeable batteries. The adjacent caps are moveable relative to the connector such that a curvature between the corresponding rechargeable batteries changes in a direction crossing the length direction.

12 Claims, 9 Drawing Sheets

(51) Int. Cl.
*H01M 2/02* (2006.01)
*H01M 4/30* (2006.01)

(56) References Cited

U.S. PATENT DOCUMENTS

| | | | | |
|---|---|---|---|---|
| 2006/0255764 | A1* | 11/2006 | Cho | H01M 2/1077 320/116 |
| 2007/0020516 | A1* | 1/2007 | Yoon | H01M 2/0245 429/152 |
| 2009/0004558 | A1* | 1/2009 | Miyazaki | H01M 2/0225 429/159 |
| 2013/0323565 | A1 | 12/2013 | Tucholski | |

* cited by examiner

RECHARGEABLE BATTERY MODULE

CROSS-REFERENCE TO RELATED APPLICATION

This application claims priority to and the benefit of Korean Patent Application No. 10-2015-0029331 filed in the Korean Intellectual Property Office on Mar. 2, 2015, the entire content of which is incorporated herein by reference.

BACKGROUND

1. Field

Aspects of the present invention relates to a rechargeable battery module including a rechargeable battery.

2. Description of the Related Art

Rechargeable batteries may be classified into a cylindrical battery, a square-shaped battery of a small size and a square-shaped battery of a large size according to a size and capacity. Due to developments in technology and the demand of mobile devices, the demand for small cylindrical rechargeable batteries and a small square-shaped rechargeable battery as an energy source has increased.

In general, a rechargeable battery includes an electrode assembly that is formed by disposing electrodes at both surfaces of a separator and by spiral-winding the electrodes and the separator in a jelly roll form, a case that houses the electrode assembly, and a cap assembly that closes and seals an open side of the case.

A known flexible rechargeable battery is formed by including a non-coated region in which an active material is not coated in an electrode assembly in order to create a bendable electrode assembly, or by having a plurality of cells that share one or a plurality of sealing surfaces within one pouch, or by connecting an electrode terminal of a plurality of cells to a circuit board.

Such rechargeable batteries have the form of a square-shaped battery in a pouch form and that imparts bending capacity to the battery, but there are many problems in bending such rechargeable batteries to have a curvature.

The above information disclosed in this Background section is only to enhance understanding of the background of the invention and therefore may contain information that does not form prior art.

SUMMARY

One or more embodiments of the present invention are directed toward a rechargeable battery module using a rechargeable battery having a pin shape and having a very small diameter, such that a curvature may be effectively imparted.

An exemplary embodiment of the present invention provides a rechargeable battery module including: a plurality of rechargeable batteries arranged in parallel, wherein each of the rechargeable batteries comprises a case and terminals that extend from respective ends of the case along a length direction of the case; a plurality of caps, wherein each of the caps is coupled to an end of a rechargeable battery of the plurality of rechargeable batteries and is electrically connected to one of the terminals of the rechargeable battery; and a connector on each of the caps connecting adjacent ones of the caps coupled to corresponding ones of the rechargeable batteries, wherein the adjacent ones of the caps are moveable relative to the connector such that a curvature between the corresponding rechargeable batteries changes in a direction crossing the length direction.

The rechargeable battery may include: an electrode assembly comprising electrodes at respective sides of a separator, wherein the electrodes and the separator are spirally-wound; and a gasket between at least one of the terminals and the case at an opening of one side of the case to close and seal the opening, wherein the at least one terminal is connected to at least one of the electrodes by a tab.

The case may have a beading portion depressed in a radial direction toward a center of the case at the opening, and at least one of the caps may have a protrusion corresponding to the beading portion and coupled to the beading portion.

The connector may include: a first arm and a second arm that are integrally formed in an adjacent pair of the caps; and a hinge connector that connects the first arm and the second arm.

The hinge connector may electrically and mechanically connect the first arm and the second arm, wherein the first and second arms are electrically connected to at least one of the caps.

The first arm and the second arm may comprise a conductive material, and may be at least partially embedded in the at least one cap, wherein the at least one cap may comprise an insulating material.

The cap may include a conductive wire line that connects at least one of the terminals to the first arm or the second arm.

The at least one cap may include: a first receiving groove that houses a portion of the case of the rechargeable battery; and a second receiving groove adjacent the first receiving groove and housing the terminal.

The second receiving groove may include a conductive pad connected to the conductive wire line and contacting the terminal.

The hinge connector may support a relative rotation of the first arm and the second arm within an angle range, and wherein the angle range may be limited by a lower bound in which external circumferential surfaces of the adjacent caps contact.

The connector may couple the plurality of rechargeable batteries in parallel.

The rechargeable battery may be formed as a pin type rechargeable battery with a diameter in the range of 2 mm to 5 mm.

In this way, according to an exemplary embodiment of the present invention, by mechanically and electrically coupling caps to both sides of a length direction of a rechargeable battery and by mechanically and electrically connecting the caps with a connector, a curvature between rechargeable batteries is changed.

BRIEF DESCRIPTION OF THE DRAWINGS

These and/or other aspects of the embodiments will become apparent and more readily appreciated from the following description, taken in conjunction with the accompanying drawings.

DETAILED DESCRIPTION

Figure 1:
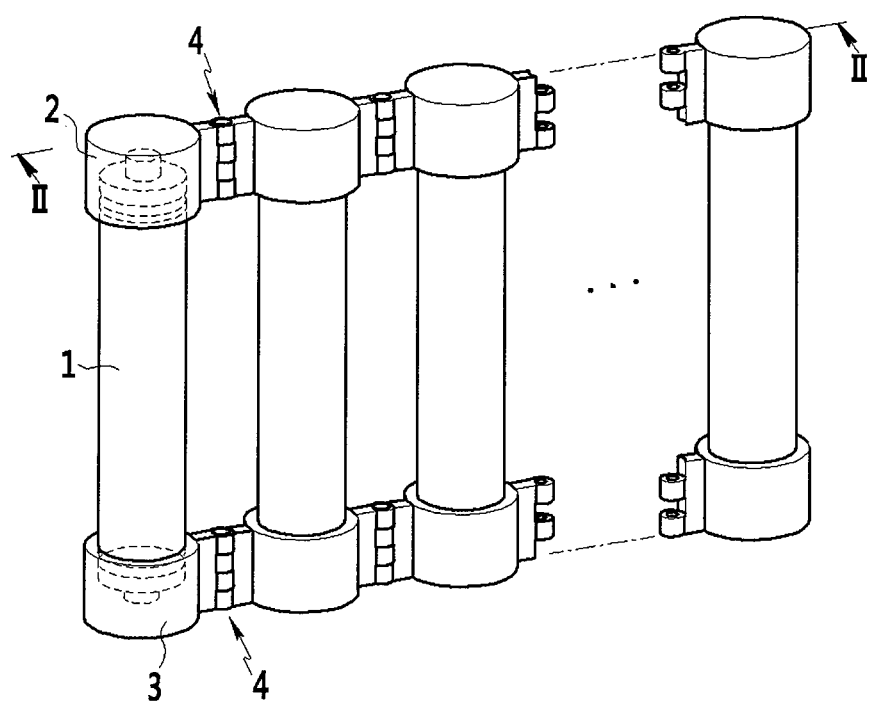
FIG. 1 is a perspective view illustrating a rechargeable battery module according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Expressions such as "at least one of," when preceding a list of elements, modify the entire list of elements and do not modify the individual elements of the list. Further, the use of "may" when describing embodiments of the present invention refers to "one or more embodiments of the present invention." It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present inventive concept.

The terminology used herein is for the purpose of describing particular embodiments only and is not intended to be limiting of the inventive concept. As used herein, the singular forms "a" and "an" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Figure 2:
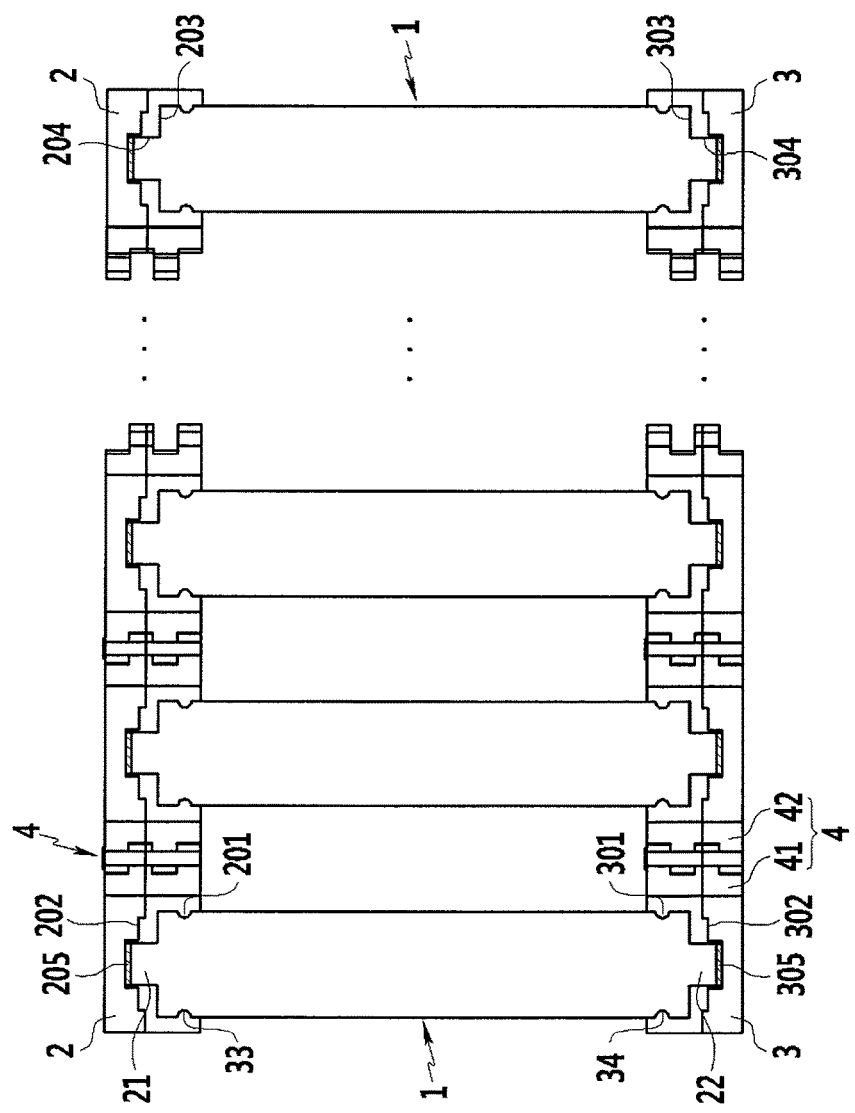
FIG. 2 is a cross-sectional view illustrating the rechargeable battery module taken along the line II-II of FIG. 1.

FIG. 1 is a perspective view illustrating a rechargeable battery module according to an exemplary embodiment of the present invention, and FIG. 2 is a cross-sectional view illustrating the rechargeable battery module taken along line II-II of FIG. 1. Referring to FIGS. 1 and 2, a rechargeable battery module of the present exemplary embodiment includes a plurality of rechargeable batteries 1, caps (or cap members) (e.g., a top cap 2 and a bottom cap 3) that are coupled to respective sides of a length direction of each rechargeable battery 1, and a connector 4 that connects the caps in a direction (i.e., diameter direction of a rechargeable battery) transverse to (or crossing) the length direction.

Figure 3:
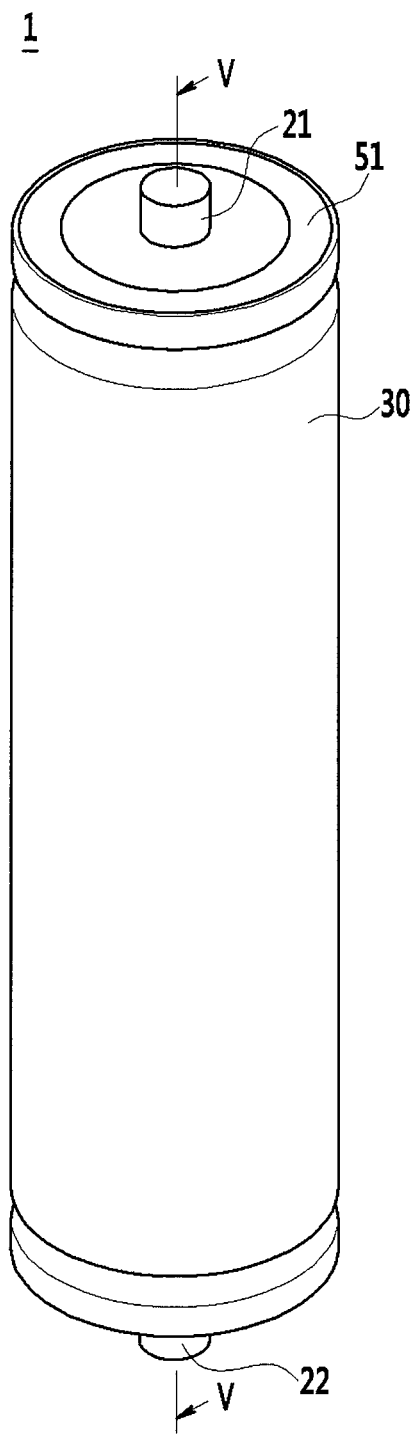
FIG. 3 is a perspective view illustrating a rechargeable battery of the rechargeable battery module of FIG. 1.

The rechargeable battery 1 is formed as a pin type (i.e., having the shape of a pin) with a diameter of several millimeters, and may be formed in a diameter of, for example, 2-5 mm. Further, the rechargeable battery 1 draws out a first terminal 21 and a second terminal 22 to respective sides of a length direction of a case 30, as shown in FIG. 3. A plurality of rechargeable batteries 1 may be arranged in parallel.

The top cap 2 and the bottom cap 3 are coupled to opposite sides of the rechargeable battery 1 along the length direction of the rechargeable battery 1. In this case, the top caps 2 are each mechanically and electrically connected to adjacent first terminals 21, and the bottom caps 3 are each mechanically and electrically connected to adjacent second terminals 22. The rechargeable batteries 1 are coupled in parallel.

The connector 4 connects the adjacent top caps 2 in the same structure and connects the adjacent bottom caps 3. The top caps 2 and the bottom caps 3 may rotate about connectors 4 to change a curvature between connected rechargeable batteries 1 in a direction transverse to (e.g., crossing) the length directions of the rechargeable batteries 1.

Figure 4:
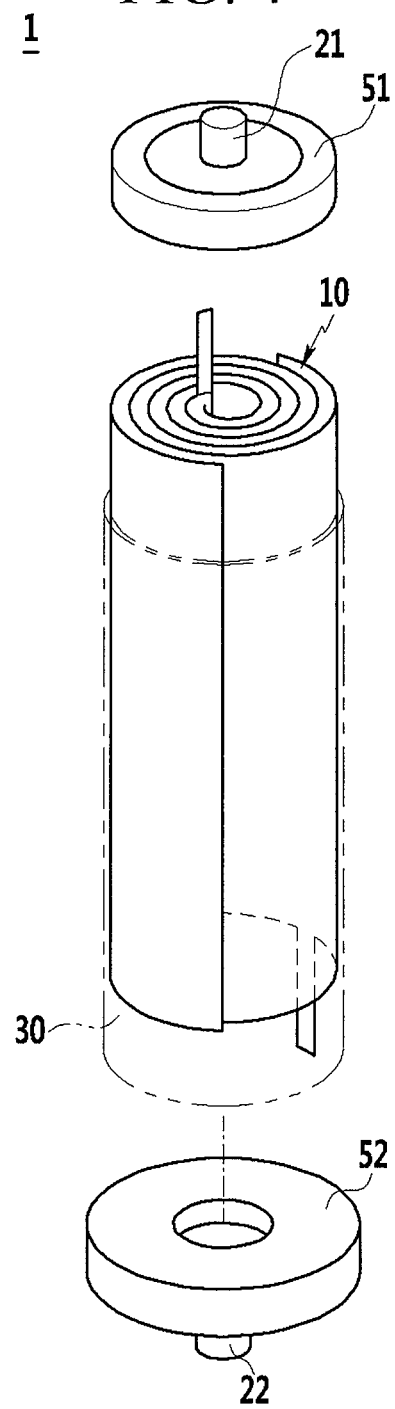
FIG. 4 is an exploded perspective view illustrating the rechargeable battery of FIG. 3.
Figure 5:
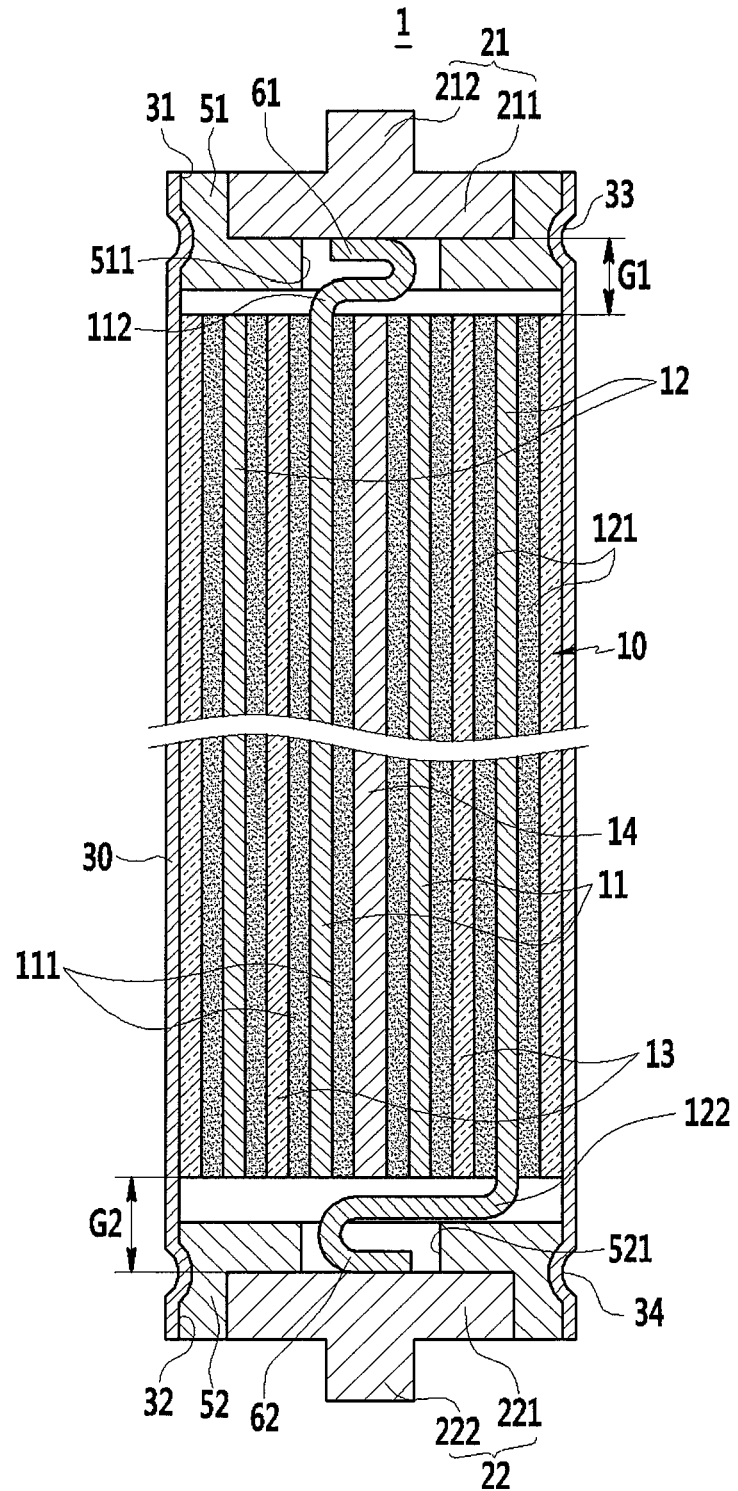
FIG. 5 is a cross-sectional view illustrating the rechargeable battery taken along the line V-V of FIG. 3.

FIG. 3 is a perspective view illustrating the rechargeable battery 1 of the rechargeable battery module of FIG. 1, FIG. 4 is an exploded perspective view illustrating the rechargeable battery 1 of FIG. 3, and FIG. 5 is a cross-sectional view illustrating the rechargeable battery 1 taken along the line V-V of FIG. 3. Referring to FIGS. 3 to 5, the rechargeable battery 1 includes an electrode assembly 10 that performs charge and discharge operations, the first terminal 21 and second terminal 22 that are connected to the electrode assembly 10, the case 30 that houses the electrode assembly 10 and an electrolyte solution, and a first gasket 51 and second gasket 52 that are interposed between the first and second terminals 21 and 22 and the case 30. The electrolyte solution may be impregnated in the electrode assembly 10.

The electrode assembly 10 includes a first electrode 11 and a second electrode 12 that are disposed at respective sides of a separator 13 such that the separator 13 is interposed therebetween, as shown in FIG. 5. The electrode assembly 10 is formed by spiral-winding the first electrode 11 and the second electrode 12, and the separator 13, which is an insulator that is disposed therebetween, in a jelly roll state.

For example, the first and second electrodes 11 and 12 with the separator 13 interposed therebetween may be spiral-wound two to five times around a winding core 14. The spiral-winding number may be selected within a range of two to five times according to a maximum diameter of the rechargeable battery 1 and a thickness of the separator 13 and the first and second electrodes 11 and 12.

When spiral-winding the first and second electrodes 11 and 12 less than two times, it is difficult to implement a required output, and when spiral-winding the first and second electrodes 11 and 12 more than five times, a diameter of the rechargeable battery 1 may exceed 5 mm. Further, a diameter of the rechargeable battery 1 sets a thickness of the rechargeable battery module and limit the amount by which a bending curvature may be changed.

The first electrode 11 and the second electrode 12 respectively include coated regions 111 and 121 in an area in which an active material is coated at both surfaces of a current collector that are each formed with a metal foil (e.g., Cu or Al foil), and uncoated regions 112 and 122 that are set to an area in which a current collector is exposed because an active material is not coated.

Figure 6:
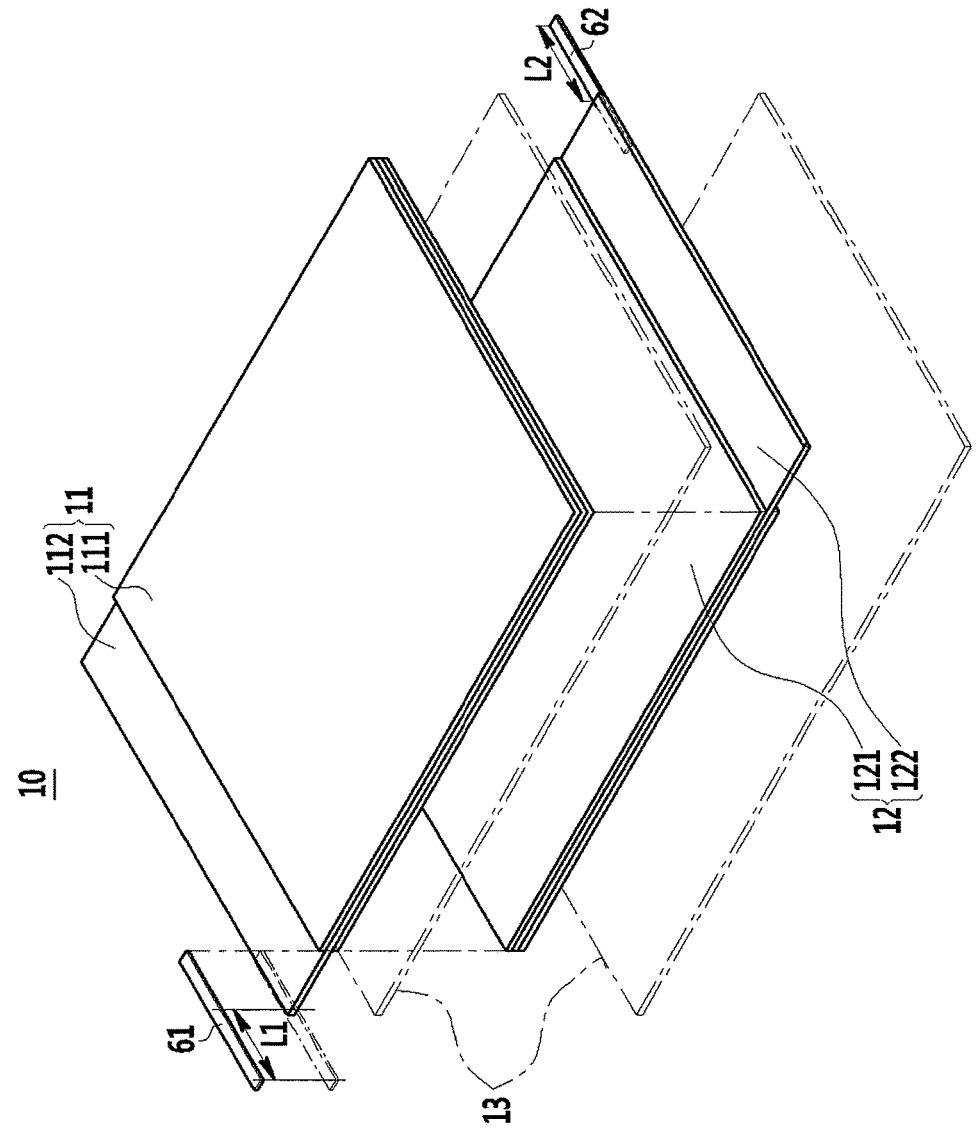
FIG. 6 is an exploded perspective view of an electrode assembly of the rechargeable battery of FIG. 4.

FIG. 6 is an exploded perspective view of the electrode assembly 10 of the rechargeable battery 1 of FIG. 4. Referring to FIGS. 4 to 6, the first terminal 21 is connected to the uncoated region 112 of the first electrode 11 with a first tab 61. The second terminal 22 is connected to the uncoated region 122 of the second electrode 12 with a second tab 62.

In order to house the electrode assembly 10, the case 30 has a first opening 31 and a second opening 32 at respective sides (or opposite ends) thereof. In order to house the cylindrical electrode assembly 10, the case 30 is formed in a cylindrical shape. The case 30 forms the rechargeable battery 1 as a pin type rechargeable battery with a very small diameter and sets an exterior diameter thereof.

The first and second terminals 21 and 22 may be connected to the first and second electrodes 11 and 12 of the electrode assembly 10 with the first and second tabs 61 and 62 through the first and second openings 31 and 32, respectively. For example, the first tab 61 may be connected to the uncoated region 112 of the first electrode 11 by welding, and the second tab 62 may be connected to the uncoated region 122 of the second electrode 12 by welding.

The first and second terminals 21 and 22 may include plates 211 and 221 that close and seal the first and second openings 31 and 32, respectively, and protrusions 212 and 222 that protrude from the plates 211 and 221, respectively. The plates 211 and 221 enable easy connection to the first and second tabs 61 and 62, respectively. The protrusions 212 and 222 enable easy connection in a device (not shown) using the rechargeable battery 1 and enable mechanical and electrical connection to the top cap 2 and the bottom cap 3, respectively.

A first gasket 51 is interposed between the first terminal 21 and the case 30 at the first opening 31 to electrically insulate the first terminal 21 from the case 30 while closing and sealing the first opening 31 together with the first terminal 21, and allows the protrusion 212 of the first terminal 21 to protrude to the outside of the case 30.

A second gasket 52 is interposed between the second terminal 22 and the case 30 at the second opening 32 to electrically insulate the second terminal 22 from the case 30 while closing and sealing the second opening 32 together with the second terminal 22, and allows the protrusion 222 of the second terminal 22 to protrude to the outside of the case 30.

A length L1 (i.e., a length protruding from the uncoated region 112) of the first tab 61 is formed longer than a first gap G1 that is set between one end of the electrode assembly 10 and the first terminal 21, as shown in FIGS. 5 and 6. Therefore, the first tab 61 may safely electrically connect the uncoated region 112 of the first electrode 11 to the first terminal 21. For this purpose, the first gasket 51 has a first tab hole 511 (e.g., a first tab opening), and the first tab 61 is disposed to bend within the first tab hole 511.

A length L2 (i.e., a length protruding from the uncoated region 122) of the second tab 62 is formed longer than a second gap G2 that is set between the other end of the electrode assembly 10 and the second terminal 22. Therefore, the second tab 62 may safely electrically connect the uncoated region 122 of the second electrode 12 to the second terminal 22. For this purpose, the second gasket 52 has a second tab hole 521 (e.g., a second tab opening), and the second tab 62 is disposed to bend within the second tab hole 521.

Accordingly, the first and second gaskets 51 and 52 are coupled to the first and second terminals 21 and 22 that are connected to the first and second electrodes 11 and 12 of the electrode assembly 10 via the first and second tabs 61 and 62, respectively. In this state, after the first and second gaskets 51 and 52 are inserted into the first and second openings 31 and 32 of the case 30, the first and second gaskets 51 and 52 are fixed in or to the first and second openings 31 and 32 of the case 30 through a crimping process.

In this embodiment, the case 30 forms first and second beading portions 33 and 34 that are depressed toward the center of the first and second openings 31 and 32, respectively, in a radial direction. The first and second gaskets 51 and 52 that are fixed by the first and second beading portions 33 and 34 seal the first and second openings 31 and 32 while allowing the first and second terminals 21 and 22, respectively, to protrude to the outside.

In other words, the first and second beading portions 33 and 34 are provided to correspond to each connection portion of the first and second terminals 21 and 22 and the first and second tabs 61 and 62, respectively, in the first and second openings 31 and 32 of the case 30. In order to process the first and second beading portions 33 and 34, the case 30 may be made of a metal, for example, aluminum or stainless steel.

The first and second beading portions 33 and 34 are depressed toward the center of the case 30 in the radial direction at a periphery of a boundary line between the first and second terminals 21 and 22 and the first and second tab holes 511 and 521, respectively, where there is a change in diameter and material. Therefore, in a state in which the first and second beading portions 33 and 34 of the case 30 compress the first and second gaskets 51 and 52, a fastening force of the first and second terminals 21 and 22 and the first and second beading portions 33 and 34 may be further reinforced. In some embodiments, the first and second gaskets 51 and 52 may be formed with a rubber stopper.

In this way, after connecting the first and second tabs 61 and 62 to the first and second electrodes 11 and 12 of the electrode assembly 10, sequentially connecting the first and second tabs 61 and 62 to the first and second terminals 21 and 22 by inserting one side of the electrode assembly 10 into the case 30, coupling the first and second gaskets 51 and 52 to the first and second terminals 21 and 22, and coupling the first and second gaskets 51 and 52 to the first and second openings 31 and 32, the first and second beading portions 33 and 34 are formed, and thus the rechargeable battery 1 is assembled.

Figure 7:
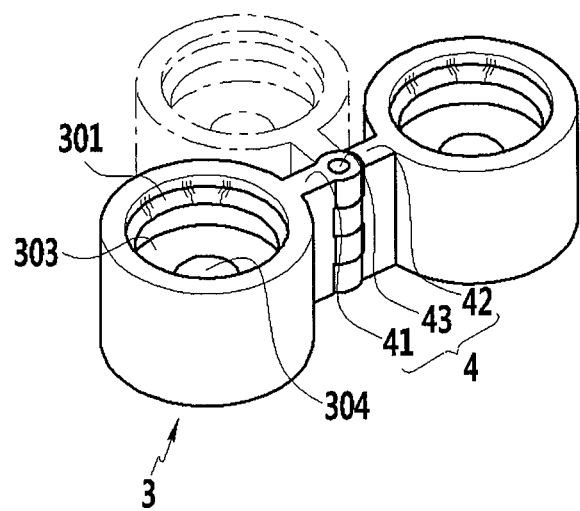
FIG. 7 is a perspective view of a cap and a connector that connect rechargeable batteries of the rechargeable battery module of FIG. 2.
Figure 8:
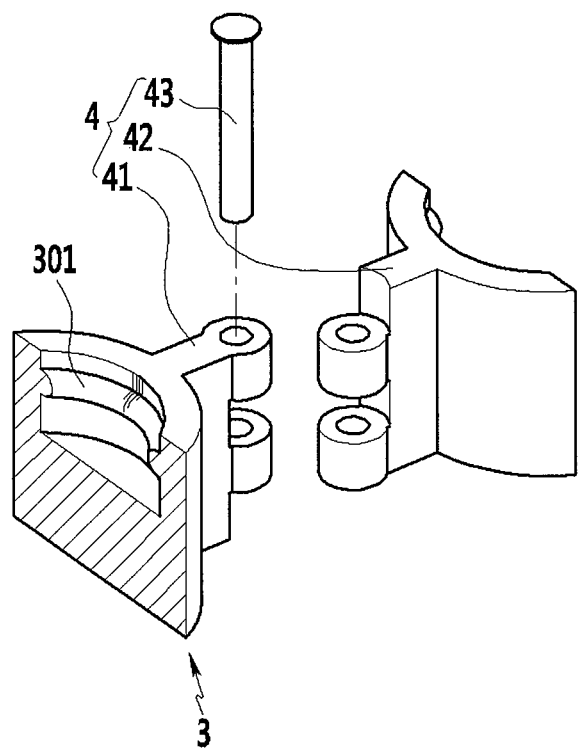
FIG. 8 is a partial perspective view of the cap and the connector of FIG. 7.

FIG. 7 is a perspective view of the cap 3 and the connector 4 that connect rechargeable batteries of the rechargeable battery module of FIG. 2, and FIG. 8 is a partial perspective view of the cap 3 and the connector 4 of FIG. 7. The top cap 2 and the bottom cap 3 may be identically formed, and the first beading portion 33 and the second beading portion 34 may be identically formed. For convenience, FIGS. 7 and 8 illustrate the bottom cap 3 and the second beading portion 34.

Referring to FIGS. 2, 7, and 8, the top cap 2 and the bottom cap 3 are coupled to the first beading portion 33 and the second beading portion 34, respectively, of the rechargeable battery 1. The top cap 2 and the bottom cap 3 have protrusions 201 and 301 at an inner surface that correspond to the first and second beading portions 33 and 34, respectively.

When coupling the top cap 2 and the bottom cap 3 to respective ends of the rechargeable battery 1, the protrusions 201 and 301 that are formed at an inner surface are coupled to the first and second beading portions 33 and 34, respectively, that are formed at an outer surface of the case 30 of the rechargeable battery 1. Therefore, coupling strength of the top cap 2 and the rechargeable battery 1 and coupling strength of the bottom cap 3 and the rechargeable battery 1 can be improved.

The connector 4 includes a first hinge arm 41, a second hinge arm 42, and a hinge connector (e.g., hinge pin) 43 that may be integrally formed in an adjacent pair of bottom caps 3. The hinge pin 43 may connect or separate the first hinge arm 41 and the second hinge arm 42.

The first and second hinge arms 41 and 42 may be made of a conductive material partially embedded in the bottom cap 3 that is made of an insulating material. The hinge pin 43 electrically connects the first and second hinge arms 41 and 42 that are electrically connected to the bottom cap 3 while mechanically connecting the first and second hinge arms 41 and 42.

As shown in FIG. 2, the top cap 2 and the bottom cap 3 have conductive wire lines 202 and 302, respectively. The conductive wire lines 202 and 302 electrically connect the first and second terminals 21 and 22 of the rechargeable battery 1 to the first and second hinge arms 41 and 42, respectively.

The top cap 2 and the bottom cap 3 further have first receiving grooves 203 and 303 that house the case 30 of the rechargeable battery 1 and second receiving grooves 204 and 304 that are formed at the bottom of the first receiving groove 203 and 303 to house the first and second terminals 21 and 22, respectively.

When coupling the top cap 2 and the bottom cap 3 to the rechargeable battery 1, both ends of the case 30 are coupled and housed to the first receiving grooves 203 and 303, and the first and second terminals 21 and 22 are coupled and housed to the second receiving grooves 204 and 304.

Further, the second receiving grooves 204 and 304 have conductive pads 205 and 305, respectively. The conductive pads 205 and 305 are connected to the conductive wire lines 202 and 302 and contact the first and second terminals 21 and 22, respectively, of the rechargeable battery 1. Therefore, the first and second terminals 21 and 22 of the rechargeable battery 1 are electrically connected through the conductive pads 205 and 305, the conductive wire lines 202 and 302, and the first and second hinge arms 41 and 42, respectively, and the hinge pin 43.

Referring to FIGS. 7 and 8, the hinge pin 43 supports relative rotation of the first and second hinge arms 41 and 42 within an angle range in which external circumferential surfaces of adjacent top caps 2 or bottom caps 3 contact.

Therefore, a bending curvature of a rechargeable battery module is set according to a width of the first and second hinge arms 41 and 42 that are set in a diameter direction of the top cap 2 or the bottom cap 3.

Figure 9:
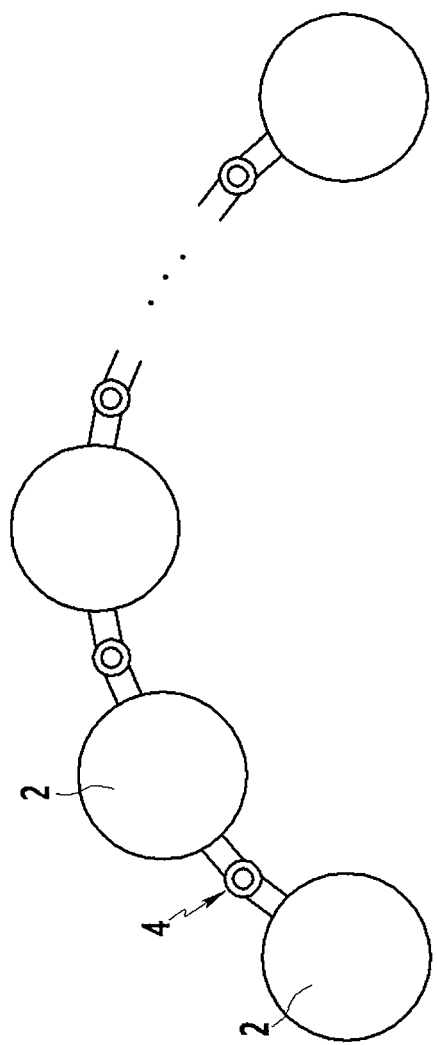
FIG. 9 is a top plan view of a bending state of the rechargeable battery module of FIG. 1.

FIG. 9 is a top plan view of a bending state of the rechargeable battery module of FIG. 1. Referring to FIG. 9, the top caps 2 of the rechargeable battery module are connected with the connector 4 to be bent. Because the rechargeable battery 1 has a very small diameter, the rechargeable battery module can be bent in various curvatures in a direction traverse to the length of the rechargeable battery 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 1: rechargeable battery | 2: top cap |
| 3: bottom cap | 4: connector |
| 10: electrode assembly | 11, 12: first and second electrodes |
| 13: separator | 14: winding core |
| 21, 22: first and second terminals | 30: case |
| 31, 32: first and second openings | 33, 34: first and second beading portions |
| 41, 42: first and second members | 43: hinge pin |
| 51, 52: first and second gaskets | 61, 62: first and second tabs |
| 111, 121: coated regions | 112, 122: uncoated regions |
| 201, 301: protrusions | 202, 302: conductive wire lines |
| 203, 303: first receiving grooves | 204, 304: second receiving groove |
| 205, 305: conductive pads | 211, 221: plates |
| 212, 222: protrusions | 511, 521: first and second tab holes |
| G1, G2: first and second gaps | L1, L2: lengths |

What is claimed is:

1. A rechargeable battery module, comprising:
   a plurality of rechargeable batteries electrically coupled to each other in parallel, wherein each of the rechargeable batteries comprises a case and terminals that extend from respective ends of the case along a length direction of the case;
   a plurality of caps, wherein each of the caps is coupled to an end of a rechargeable battery of the plurality of rechargeable batteries such that each of the rechargeable batteries is coupled to two caps of the plurality of caps, and each of the caps is electrically connected to a corresponding one of the terminals of the rechargeable battery; and
   a connector on each of the caps connecting adjacent ones of the caps coupled to corresponding ones of the rechargeable batteries,
   wherein the adjacent ones of the caps are moveable relative to the connector such that a curvature between the corresponding rechargeable batteries changes in a direction crossing the length direction.

2. The rechargeable battery module of claim 1, wherein at least one of plurality of rechargeable batteries comprises:
   an electrode assembly comprising electrodes at respective sides of a separator, wherein the electrodes and the separator are spirally-wound; and
   a gasket between at least one of the terminals and the case at an opening of one side of the case to close and seal the opening,
   wherein the at least one terminal is connected to at least one of the electrodes by a tab.

3. The rechargeable battery module of claim 2, wherein the case comprises a beading portion depressed in a radial direction toward a center of the case at the opening, and
   at least one of the caps comprises a protrusion corresponding to the beading portion and coupled to the beading portion.

4. The rechargeable battery module of claim 1, wherein the connector on an adjacent pair od the caps comprises:
   a first arm and a second arm that are integrally formed in the adjacent pair of the caps; and
   a hinge connector that connects the first arm and the second arm, respectively, in the adjacent pair of the caps.

5. The rechargeable battery module of claim 4, wherein the hinge connector electrically and mechanically connects the first arm and the second arm, wherein the first and second arms are electrically connected to at least one of the caps of the adjacent pair of the caps.

6. The rechargeable battery module of claim 5, wherein the first arm and the second arm comprise a conductive material at least partially embedded in the at least one cap, wherein the at least one cap comprises an insulating material.

7. The rechargeable battery module of claim 6, wherein the at least one cap comprises a conductive wire line that connects at least one of the terminals corresponding to the adjacent pair of the caps to the first arm or the second arm.

8. The rechargeable battery module of claim 7, wherein the at least one cap comprises:
   a first receiving groove that houses a portion of the case of one of the plurality of rechargeable batteries; and
   a second receiving groove adjacent the first receiving groove and housing the at least one terminal.

9. The rechargeable battery module of claim 8, wherein the second receiving groove comprises a conductive pad connected to the conductive wire line and contacting the at least one terminal.

10. The rechargeable battery module of claim 5, wherein the hinge connector supports a relative rotation of the first arm and the second arm within an angle range, and wherein the angle range is limited by a lower bound in which external circumferential surfaces of the adjacent pair of the caps contact.

11. The rechargeable battery module of claim 1, wherein a connector on an adjacent pair of the plurality of caps electrically couples two batteries of the plurality of rechargeable batteries in parallel.

12. The rechargeable battery module of claim 1, wherein each of the plurality of rechargeable batteries is a pin type rechargeable battery with a diameter in the range of 2 mm to 5 mm.

* * * * *